United States Patent [19]
Granquist

[11] 3,876,558
[45] Apr. 8, 1975

[54] CATALYTIC COMPOSITION OF MATTER

[75] Inventor: William T. Granquist, Houston, Tex.

[73] Assignee: NL Industries, Inc., New York, N.Y.

[22] Filed: Mar. 16, 1972

[21] Appl. No.: 235,417

[52] U.S. Cl............ 252/455 Z; 252/455 R; 208/120
[51] Int. Cl............................................... B01j 11/40
[58] Field of Search .................................. 252/455 Z

[56] References Cited
UNITED STATES PATENTS

| | | | |
|---|---|---|---|
| 3,210,267 | 10/1965 | Plank et al. ........................ | 252/455 Z |
| 3,663,424 | 5/1972 | Jaffe................................... | 252/455 Z |
| 3,716,475 | 2/1973 | Csicsery et al. .................... | 250/455 Z |

*Primary Examiner*—C. Dees
*Attorney, Agent, or Firm*—Delmar H. Larsen; Roy F. House; Robert L. Lehman

[57] ABSTRACT

A composition of matter having high catalytic activity, especially for cracking hydrocarbons, is prepared by intimately mixing from 15 to 80 percent by weight of synthetically produced interstratified montmorillonite-mica-like silicate mineral, exemplified by that obtainable in accordance with U.S. Pat. Nos. 3,252,757 and 3,252,889; from 1 to 40 percent of faujasite, natural or synthetic, having a silica-to-alumina ratio within the range of about 3 to about 6 ½; and from 5 up to about 70 percent of a silicate material chosen from the class consisting of kaolinite, metakaolinite, halloysite, metahalloysite, and montmorillonite, and mixtures thereof, said mixing being carried out in an aqueous slurry with the base-exchangeable components in their ammonium form, followed by drying and calcining and grinding.

7 Claims, No Drawings

CATALYTIC COMPOSITION OF MATTER

This invention relates to novel compositions of matter having enhanced catalytic activity, particularly for the catalytic cracking of hydrocarbons.

Catalysts have been employed for many years in the transformation of crude petroleum and its various components and derivatives, into products of greater economic value for specific purposes. One of the most widely employed catalytic transformations of this general type is the conversion of petroleum hydrocarbons having molecular weigths greater than the hydrocarbons comprising gasoline into products of lower molecular weight useful as motor fuels of the gasoline type. Cracking catalysts useful for this transformation have comprised natural clays, more or less amorphous alumina-silica materials, zeolitic minerals, and others. The overall procedure is well known and need not be detailed here. Those unfamiliar with the art will find adequate descriptions in such books as *Catalysis*, P. H. Emmett, editor, Vol. 6, Chapter 5 (New York 1958) and Vol. 7, Chapter 1 (New York 1960) and, *Advances in Catalysis*, W. G. Frankenberg et al., editors, Vol. 3, pp. 179–247, (New York 1951) and Vol. 4, pp. 1–30 and 88–149, (New York 1952).

The most widely employed procedure at the present time utilizes the cracking catalyst in particles small enough to form a fluidized bed. An adequate description of this and closely related procedures may be found in *Petroleum Processing*, May 1957, pp. 98 – 107.

No known cracking catalyst is free from practical disadvantages in use. For example, an ideal catalyst for gasoline production would cause all of the feed stock to be transformed into 100 percent gasoline hydrocarbons, without attrition, loss, or change in catalytic effectiveness even though used indefinitely. Needless to say, the known commercial catalysts fall considerably short of the ideal. Specific figures will be given hereinbelow, but it may be stated that in the present state of the art a catalyst manufacturer considers himself fortunate if he can produce a catalyst which will transform substantially more than one-half of the feed stock into a high percentage of usable gasoline hydrocarbons; and a similar statement holds for other desired products.

An object of the present invention is to provide a composition of matter which is particularly useful as a catalyst and especially so for hydrocarbon cracking, of a nature which gives excellent gasoline yields, and moreover which represents an enhanced effectiveness of any of the components taken separately.

Other objects of the invention will appear as the description thereof proceeds.

A useful catalyst has been provided by the invention development described in U.S. Pat. Nos. 3,252,757 and 3,252,889. These patents teach the production, by hydrothermal synthesis, of a laminar clay-like i.e. clay type mineral, as described more fully in the cited patents, and which represents a mixed layer structure having randomly alternating layers of montmorillonite-like and mica-like clay mineral. That invention product has excellent utility as a hydrocarbon cracking catalyst, and quantitative test results will be found in the two patents cited.

The laminar clay-like mineral described in the aforesaid patents has a silica-to-alumina ratio within the range of 2.4 to 3.0. The mineral compositions within this range represent a distinct species within a group having at least two members. The other species of which I am aware has a silica-to-alumina ration within the range of less than 2.4 but more than 1.8. As will appear in greater detail hereinbelow, members within each of the two species may be distinguished by their swelling behavior with ethylene glycol.

Even the materials just described can however be improved as catalysts, and more particularly as cracking catalysts, in accordance with the present invention. Generally speaking, and in accordance with illustrative embodiments of the invention, I produce an intimate mixture of from 1 to 40 percent (by weight) of faujasite, which may be natural or synthetic, having a silicaalumina ratio within the range of about 3 to about 6½ with from about 15 to about 80 percent of either of the synthetic clay-like minerals just described or mixtures of the two in any proportions, and from 5 up to about 70 percent of a silicate substance chosen from the class exemplified by kaolinite, metakaolin, halloysite, metahalloysite, and montmorillonite, and mixtures thereof, all as more fully described below.

Continuing with the general description of the inventive procedure, I place the selected synthetic clay mineral or mixture thereof and the faujasite in their ammonium forms, if not already therein, together with the selected silicate substance or mixture thereof, and slurry them in water, and agitate the slurry so that a thoroughly homogeneous blend is produced. The synthetic clay mineral and the faujasite are of exceedingly fine particle size, predominantly finer than about three microns in size; and the additional silicate substance (or mixture of several thereof) is likewise dispersed to the same order of magnitude. After a homogeneous slurry is produced by this mixing process, the slurry is dried to produce the inventive catalyst material. I have found spray drying to be best, since this enables particles of roughly spherical shape to be produced all within the optimum particle size range for fluid-bed catalytic cracking (FCC) which is approximately 20 to 150 microns. However, the slurry may be dried by other means, such as on a heated drum, and later ground by any of the usual methods to produce a powder of any desired fineness. Various additional additives or treating agents, particularly in accordance with further embodiments of the invention, may in general conveniently be added to the slurry and homogenized therewith before drying.

Entirely aside from considerations of catalysts, the products made as described have substantial utility as adsorbents, for example for clarification of fluids; and as desiccants.

At this stage, the catalyst material will contain some water, the amount largely dependent upon the drying conditions, and most of the exchangeable cation sites will be occupied by ammonium ion. This material is then calcined at a temperature which optimally is 1,300°F. to about 1,500°F. At the highest temperature just mentioned, there is some loss in catalytic effectiveness as compared with the same material dried at 1,300°F. The calcining has the effect of dehydrating the material and at the same time decomposing the ammonium ion to ammonia gas which is driven off and hydrogen cation which remains in the material. The calcination also brings about some modification of the mineral species present, as discussed hereinbelow.

The so-calcined material is then of high utility as a cracking catalyst, although I prefer to first subject the calcined material to a steam treatment for several hours at a like temperature, such as 1,350°F. for 8 hours in an atomsphere of steam at 15 pounds per square inch gauge. The steam-treated material is then preferably recalcined at a like temperature, such as 1,300°F., for several hours, such as 4 hours. The material so produced is as a general rule even better as a hydrocarbon cracking catalyst. It needs no added binder, the clay-like mineral serving to produce coherent particles having adequate mechanical stability.

As those skilled in the art will recognize, both the synthetic clay-like mineral and the faujasite possess cations which are not a permanent part of the crystal lattice but which may be exchanged for others, but which are necessary for electrostatic neutrality of the substance as a whole. The silicate substance component likewise has a content of exchangeable cations, which for example is relatively low for kaolin and relatively high for montmorillonite. When I speak of placing the substance in the ammonium form, I refer to exchanging any other cations which may be originally present, such as sodium, or sodium and calcium and the like, by ammonium ion. Also, when I refer to ammonium ion, I mean to include ammonium derivatives which are small enough to fit into the lattice and which will decompose under calcination in the same fashion to leave solely residual hydrogen cation. Typical such ammonium derivatives are methylammonium, trimethylammonium, ethylammonium, and the like. In general I prefer ordinary ammonium ion, in view of its simplicity, effectiveness, availability, and low cost, and as will be seen below, the synthetic clay-like mineral is generally originally produced in its ammonium form.

Coming now to the synthetic clay-like mineral in more detail, the production and properties of one species of this substance are fully described in the aforesaid U.S. Pat. Nos. 3,252,757 and 3,252,889, which are hereby incorporated herein by reference. As initially produced, this synthetic mineral substance has some water associated with the crystal lattice, and furthermore as ordinarily made has its exchangeable cation initially as ammonium. If any other cation is present instead, it may be converted to the ammonium form, by known methods, an instance of which appears in Example 4 of U.S. Pat. No. 3,252,757. This first species of synthetic clay-like mineral in its ammonium form may be described as having the following empirical formula:

$$n\text{SiO}_2 : \text{Al}_2\text{O}_3 : m\text{AB} : x\text{H}_2\text{O}$$

where the layer lattices comprise said silica, said alumina, and said B, and where $n$ is from 2.4 to 3.0,
$m$ is from 0.2 to 0.6,
A is one equivalent of ammonium cation and is external to the lattice,
B is chosen from the group of negative ions which consists of $F^-$, $OH^-$, ½ $O^{--}$ and mixtures thereof, and is internal in the lattice, and
$x$ is from 2.0 to 3.5 at 50 percent relative humidity, said mineral being characterized by a $d_{001}$ spacing at said humidity within the range which extends from a lower limit of about 10.4 A. to an upper limit of about 12.0 A.

The second species of synthetic clay-like mineral in its ammonium form may be described as having the following empirical formula:

$$n\text{SiO}_2 : \text{Al}_2\text{O}_3 : m\text{AB} : x\text{H}_2\text{O}$$

wherein the layer lattices comprise said silica, said alumina, and said B, and where $n$ is more than 1.8 but less than 2.4,
$m$ is from 0.4 to 0.8,
A is one equivalent of ammonium cation and is external to the lattice,
B is chosen from the group of negative ions which consists of $F^-$, $OH^-$, ½ $O^{--}$ and mixtures thereof, and is internal in the lattice, and
$x$ is from 2.0 to 3.5 at 50 percent relative humidity, said mineral being characterized by a $d_{001}$ spacing at said humidity within the range which extends from a lower limit of about 10.4 A. to an upper limit of about 12.0 A.

As obtained, and as added to the slurry, this synthetic clay-like mineral is of such a fine particle size that it need not be ground.

After the calcining step, in the course of which both ammonia and water are lost, the calcined synthetic clay-like mineral has a composition which may be characterized as having the empirical formula, for the first species thereof:

$$2.4 \text{ to } 3.0 \text{ SiO}_2 : \text{Al}_2\text{O}_3 : 0.2 \text{ to } 0.6 \text{ AB}$$

wherein the layer lattices comprise said silica ($\text{SiO}_2$), said alumina ($\text{Al}_2\text{O}_3$) and said B;
wherein A is one equivalent of hydrogen, and
wherein B is one equivalent of an anion selected from the group consisting of fluoride, hydroxyl, and oxygen ions, and mixtures thereof;
said crystalline material being further characterized by a $d_{001}$ spacing ranging from 9.6 to 10.2 Angstrom units determined at 50 percent relative humidity and being predominantly ordered in two dimensions.

Likewise, after the described calcining step, the second species of the synthetic clay-like material will have the following empirical formula:

$$k\text{SiO}_2 : \text{Al}_2\text{O}_3 : 0.4 \text{ to } 0.8 \text{ AB}$$

wherein the layer lattices comprise said silica ($\text{SiO}_2$), said alumina ($\text{Al}_2\text{O}_3$) and said B;
wherein $k$ is greater than 1.8 but less than 2.4;
wherein A is one equivalent of hydrogen, and
wherein B is one equivalent of an anion selected from the group consisting of fluoride, hydroxyl, and oxygen ions, and mixtures thereof;
said crystalline material being further characterized by a $d_{001}$ spacing ranging from 9.6 to 10.2 Angstrom units determined at 50 percent relative humidity and being predominantly ordered in two dimensions.

Returning now to the two species of the synthetic clay-like material, the first species may be made in accordance with the instructions found in the two patents cited, viz., U.S. Pat. Nos. 3,252,757 and 3,252,889. The second species, in which the silica-to-alumina molar ratio lies between 1.8 and 2.4, may be made by modifying the directions for the preparation of the first species, as follows:

Referring to the general formulation given hereinabove for the second species, the $\text{SiO}_2$ and $\text{Al}_2\text{O}_3$ components should be in a molar ratio of from about 1.8 to less than 2.7, depending upon the composition desired in the final product. The molar ratio of the anion B in the formulation given to alumina is correspondingly inversely within the range of about 0.8 to about 0.4. As the selected silica to alumina ratio becomes lower, and thus as the molar ratio of B to alumina becomes higher, in accordance with the foregoing, I find it useful to add AB in the form of a mixture of $NH_4F \cdot HF$ and $NH_4OH$ in such proportions that the $F/SiO_2$ molar ratio approximates 0.1. The inclusion of fluoride ion, particularly at the lower silica/alumina ratios, expedites crystallization from the reaction mixture.

The first and second species are distinguished not only by their respective silica-to-alumina ratio ranges, but hand-in-hand with these two ranges there is exhibited a striking difference in behavior when treated with ethylene glycol. The following table shows the basal spacings obtained by x-ray diffraction on a series of syntheses of the laminar-clay-like mineral in which the silica-to-alumina ratio was varied from about 2.2 to 2.6, and thus bridging the ranges for both species. The treatment with ethylene glycol and the x-ray diffraction determinations were made in the conventional fashion, as described for example in the book by George Brown (editor), *The X-Ray Identification and Crystal Structures of Clay Minerals*, London, 1961. At the same time, x-ray diffraction determinations were made on the untreated samples which however had been permitted to come to equilibrium at room temperature in an atmosphere of 50 percent relative humidity.

TABLE I

| Sample | Ratio | "001/001 50% RH | "001/001 Glycolated |
|---|---|---|---|
| A | 2.22 | 11.13 | 12.25 |
| B | 2.27 | 11.13 | 12.62 |
| C | 2.33 | 11.21 | 12.69 |
| D | 2.40 | 11.72 | 17.14 |
| E | 2.54 | 11.89 | 17.24 |
| F | 2.60 | 12.05 | 17.52 |
| G | 3.00 | 12.55 | 17.45 |

The striking difference in behavior between the two species is evident from the last column of the above table. In going from an $SiO_2/Al_2O_3$ ratio of 2.22 to 2.30, there is a small increase in spacing, all within the range of 12.2 to 12.7 A. However, by the time a ratio of 2.40 has been reached, a sudden jump to a spacing of more than 17 A has taken place, and increasing the ratio above 2.40 does not result in any spacing larger than 17 to 18 A. I am not aware of the reasons for this discontinuity in the glycolated spacing as between the two species; a critical difference in charge balance may exist above which one modification is stable, and below which the other is stable.

The faujasite may be natural, as already mentioned, although a commercial source of natural faujasite in quantity has apparently not yet been found, so that it is preferable to make it synthetically. Many procedures for this have been published, most generally in the patent literature, as for example U.S. Pat. Nos. 3,130,006, 3,130,007, 3,338,672, and others. Synthetic faujasite having the specified silica-alumina ratio is commercially available under the fanciful name of "Zeolite Y." Here again, the synthetic faujasite, while crystalline, is generally minute in particle size, and only exceptionally will need to be ground to suitable fineness for slurrying. Should any extensive natural deposit be found, it is possible that the crystallinity will be well developed so that grinding will be desirable.

Coming now to the silicate substance component, as already noted, this may comprise kaolinite, metakaolinite, halloysite, metahalloysite, and montmorillonite, and mixtures of any or all of these in any desired relative proportion. These are all clay minerals and are obtainable commercially, and when converted to their ammonium form require no special comminution for reduction to a fine particle size for slurrying. It may be noted that kaolinite, metakaolinite, halloysite, and metahalloysite have quite low cation-exchange capacity, so that conversion of these to the ammonium form, while desirable, is not essential.

In preparing a slurry of the three (or more) ingredients, no special precautions need to be observed, except to be sure that the particle size of the individual components is lower than about three or four microns or at least reduceable to that size in the course of the slurrying and agitation; and to agitate the slurry enough to bring about a thorough intermixing of the particles, so that when a dried particle of say 50 microns diameter is eventually produced and formed, it will have the same mineral composition as the bulk of the slurry and thus will comprise a very large number of the component mineral particle all in intimate mutual contact. The total mineral interface area is accordingly very large. The water content of the slurry is not critical; enough water should be present to result in a pumpable and agitatable slurry. A substantially higher water content than this does no harm but reduces the throughput of any given drying apparatus used for drying the slurry. As already mentioned, any conventional methods of drying may be employed, and if spray drying which gives an optimum particles size is not used, conventional grinding apparatus may be used to obtain it.

Returning now to the calcined product, the composition of the calcined clay-like mineral has already been noted. The faujasite retains its fundamental framework structure. The other mineral species which are present undergo some change, in addition to the loss of ammonia and water already mentioned. The starting and resulting species are as follows:

Table II

| | |
|---|---|
| kaolinite | metakaolinite |
| metakaolinite | metakaolinite |
| halloysite | metahalloysite |
| metahalloysite | metahalloysite |
| montmorillonite | montmorillonite |

EXAMPLE 1

An example will now be given of some compositions within the scope of the invention, in which the laminar clay-like mineral prepared and used was of the second species described. That is, it had a silica-to-alumina ratio which was less than 2.4 but more than 1.8, and in the present instance, it was 2.30.

An aqueous solution of polysilicic acid having an $SiO_2$ content of 5.3 percent; commercial alumina, "Alcoa C-31" having an $Al_2O_3$ content of 69.4 percent; commercial $NH_4F_2H$ assaying 96 percent; and commercial ammonium hydroxide assaying 58.8 percent, were combined in suitable relative proportions to give a feed composition having the following molar ratios:

$SiO_2/Al_2O_3$ : 2.4

$F/SiO_2$ : 0.1

$NH_4/Al_2O_3$ : 0.55

This mixture, which had a pH of 9.0, was placed in an autoclave, heated to 300°C., maintained at this temperature for three hours, and allowed to cool in the autoclave. The heatup time was 13 hours, and the cooling time was overnight. The product had a pH of 7.2, and a $SiO_2/Al_2O_3$ ratio of 2.30.

The synthetic clay-like mineral thus prepared was mixed with an equal weight of kaolinite and 22.2 percent of its weight of commercial faujasite having a silica:alimina ratio of 4.87, and which had been ion-exchanged to the ammonium form. The three ingredients were thus in the relative weight proportions of 45:45:10. The synthetic clay-like mineral was used in its slurry form as discharged from the autoclave, without drying. After the kaolinite and the faujasite had been added to this slurry in the proportions already given, the mixture was vigorously agitated in a commercial mixer, viz., an Eppenbach mill. After agitation, a slurry was filtered, dried at 105°C., ground to approximately 30 to 60 mesh, and then calcined at 1,300°F. for 4 hours. The calcined material was then steam aged at 1,350°F. for 8 hours, in an atmosphere of steam at 15 pounds per square inch gage. This aged material was then recalcined at 1,300°F. for 4 hours.

Similar compositions were made up in the same proportions as the foregoing, except that for the kaolinite there were substituted, variously, halloysite, and montmorillonite which had been ion-exchanged to the ammonium form. As explained previously, the base-exchange capacities of kaolinite and halloysite are sufficiently low that these were not converted, but the montmorillonite was. The sequence of mixing, filtering, drying, calcining, steam aging, and recalcining was carried out precisely as described for the kaolinite-bearing mixture.

In all cases, the compositions obtained were in the form of essentially spherical particles, with about 85 percent by weight of the particles falling within the particle size range of 20 microns to 80 microns in diameter.

The results of tests to determine the cetane cracking behavior at 500°C. of the product thus obtained are given below, and for comparison similar data are given for a mixture of 90 percent kaolinite and 10 percent of faujasite.

TABLE III

| Composition | % Conversion | % Gasoline |
|---|---|---|
| 45% clay-like mineral<br>45% kaolinite<br>10% faujasite | 72.4 | 44.7 |
| 45% clay-like mineral<br>45% halloysite<br>10% faujasite | 69.6 | 45.4 |
| 45% clay-like mineral<br>45% montmorillonite<br>10% faujasite | 62.7 | 48.9 |
| 90% kaolinite<br>10% faujasite | 60.1 | 38.9 |

In the table above, the percent conversion is the volume percent conversion of cetane to all products, corrected to 100 percent weight balance. The per cent gasoline is the volume per cent conversion of cetane to gasoline, again corrected to 100 percent weight balance.

It may be seen that the tripartite compositions in accordance with the invention give a substantial increase in gasoline yield as well as in the total per cent of conversion, as compared with a controlled composition in which, in effect, an equal weight of kaolinite was substituted for the synthetic clay-like mineral.

EXAMPLE 2

As a further example of compositions in accordance with the invention, a synthetic clay-like mineral was made up substantially in accordance with Example 1 of U.S. Pat. No. 3,252,757, although using a substantially larger batch. The $SiO_2/Al_2O_3$ ratio of the product was 2.55. This was made up into a tripartite composition following the procedure given in Example 1 hereinabove, the ingredients being 45 percent of the synthetic clay-like mineral just described; 45 percent metakaolin; and 10 percent of commercial faujasite having a $SiO_2/Al_2O_3$ ratio of 4.87, and which had been previously ion-exchanged so as to be in the magnesium ammonium form, the molar ratio of magnesium to ammonium being approximately 1:1.

Tests were carried out in a small scale fluid cracking apparatus in comparison with a widely sold commercial cracking catalyst said and believed to contain 10 percent high silica faujasite. The feed was an actual charge stock used in a large oil refinery for fluid catalytic cracking, having an API gravity of 25.7, an aniline point of 179°F., and consisting of approximately 55 percent saturated hydrocarbons and approximately 42.4 percent aromatic hydrocarbons. Results obtained in the test runs for both the composition in accordance with the invention and the commercial catalysts were as follows, two runs for each catalyst being shown:

TABLE IV

| CATALYST: | Commercial Catalyst | | Inventive Composition | |
|---|---|---|---|---|
| Kellogg Activity (2Hr.) | 39.5 | 39.0 | 59.4 | |
| Surface Area: M²/G. | 130 | 136 | 110 | |
| Run Number | 1 | 2 | 3 | 4 |
| Operat. Cond., Reactor | | | | |
| Avg. Temp., Deg. F: | 932. | 918. | 918. | 916. |
| Av. Press., PSIG | 25.0 | 23.0 | 23.0 | 23.0 |
| Recycle, Pct. by Vol. | | | | |
| Fresh Feed | 2.5 | 35.4 | 2.3 | 35.0 |
| Light Cat. Gas Oil | 0.0 | 0.0 | 0.0 | 0.0 |
| Heavy Cat. Gas Oil | 0.0 | 32.8 | 0.0 | 32.5 |
| Slurry Oil | 2.5 | 2.5 | 2.3 | 2.4 |

TABLE IV -Continued

| CATALYST: | Commercial Catalyst | | Inventive Composition | |
| --- | --- | --- | --- | --- |
| Conversion, Pct. by Vol. of Fresh Feed (100-Gas Oil) | 67.3 | 74.8 | 79.0 | 89.0 |
| Yields, Pct. by Vol. of Fresh Feed (corr. to 100 Pct. Wt. Balance) | | | | |
| Debut. Gasoline Dist: | 51.6 | 56.7 | 60.0 | 64.2 |
| Butane-Butene | 12.8 | 14.0 | 15.0 | 16.4 |
| Propane-Propylene | 8.6 | 8.6 | 9.7 | 10.9 |
| Motor Octane Numbers | | | | |
| Clear: | 79.3 | 79.5 | 80.7 | 80.1 |
| 3 cc Tel: | 85.7 | 86.3 | 87.4 | 87.3 |

In the table above, the first and third columns represent single-pass runs, whereas the second and fourth columns represent recycle operations.

From the above results, it will be seen that the inventive composition substantially outperformed the commercial catalyst, in giving higher percent conversion, higher percent gasoline, higher octane numbers, and enhanced response to tetraethyl lead.

As has been mentioned earlier, the present invention includes modifications in which additional substances are present, generally in relatively minor amount, which most generally enhance the effectiveness of the inventive compositions as catalysts. In Example 2 hereinabove, the magnesium ion present in substantially equal molar amount with the ammonium ion in the cation exchange positions on the faujasite helps to stabilize the latter against the long-term effects of high temperatures. In accordance with a further embodiment of my invention, I may incorporate a minor amount of rare earth metal cations, which may alternatively be emplaced on the faujasite or on the synthetic clay-like mineral, by the usual cation exchange techniques. If desired, one may add the rare earth metal cations in the form of a suitable salt thereof to the slurry containing the synthetic clay-like mineral, the silicate substance, and the faujasite. In this fashion, the rare earth metal cations have full access to all of the exchange positions in all of the substances present. It has not been determined what distribution of the rare earth metal cations takes place as between the faujasite and the clay-like minerals, and mineral, also the montmorillonite in the event that that is present as the silicate substance or one of the several silicate substances used in the mix. In general, however, I prefer to exchange the rare earth metal cations, and the magnesium ions if used, onto the faujasite as a separate operation. Calcium ion may likewise be employed with or in place of the magnesium ion. In any case, the effects of this incorporation are most beneficial, as will appear from the following example:

EXAMPLE 3

A synthetic clay-like mineral of the second species as hereinbefore described was prepared substantially as described in Example 1 hereinabove, except that the silica/alumina ratio of the feed composition was approximately 2.3, the other details being essentially as before. The silica/alumina ratio of the product was 2.23.

This synthetic clay-like mineral was mixed with an equal weight of kaolinite and varying percentages by total weight of the composition of a high silica faujasite having a silica/alumina mol ratio of 4.87. In one series of experiments, the faujasite was preliminarily cation-exchanged with rare earth cations and ammonium cations to give a content of 0.85 milliequivalents per gram of rare earth cations and 2.1 milliequivalents per gram of ammonium ions. In another series of samples, the faujasite was cation exchanged so as to contain 1.9 milliequivalents per gram of magnesium ion and 0.95 milliequivalents per gram of ammonium ion. The components were mixed together with water so as to form a slurry, which was then further treated as described for Example 1, resulting in a calcined, steam-aged catalyst.

In an additional series of tests, the same synthetic clay-like mineral was mixed with the kaolinite in a kaolinite/clay mineral ratio of 5:1. The faujasite was exchanged with various cations as already described.

Cracking tests on the various samples made up in accordance with the foregoing gave the following results:

TABLE V

Cracking Data for $K_1B_1$ Matrix + Various Wt.% Faujasite
Comparison of RE- and $MgNH_4$-Stabilization

| % Faujasite | Conv, Vol% | Gaso/Conv | -ane -ene | Coke Selectivity | $H_2$ Selectivity |
| --- | --- | --- | --- | --- | --- |
| | | RE-stabilized | | | |
| 10 | 83.5 | 0.62 | 3.00 | 0.0386 | 0.0240 |
| 20 | 90.0 | 0.65 | 4.08 | 0.0464 | 0.0248 |
| 35 | 91.6 | 0.55 | 8.45 | 0.0690 | 0.0129 |
| | | $MgNH_4$-stabilized | | | |
| 5 | 54.9 | 0.75 | 1.15 | 0.0231 | 0.0089 |
| 10 | 75.6 | 0.74 | 1.82 | 0.0227 | 0.0088 |
| 15 | 79.3 | 0.68 | 2.55 | 0.0274 | 0.0113 |
| 20 | 76.7 | 0.75 | 1.54 | 0.0207 | 0.0089 |
| 25 | 77.5 | 0.72 | 1.88 | 0.0226 | 0.0061 |
| 35 | 75.1 | 0.73 | 1.83 | 0.0247 | 0.0045 |

TABLE VI

Cracking Data for K₅B₁ Matrix + Various Wt. % Faujasite
Comparison of RE-and MgNH₄-Stabilization

| % Faujasite | Conv, Vol% | Gaso/Conv | -ane -ene | Coke Selectivity | H₂ Selectivity |
|---|---|---|---|---|---|
| | | RE-stabilized | | | |
| 10 | 75.5 | 0.68 | 2.88 | 0.0361 | 0.0304 |
| 35 | 90.9 | 0.50 | 7.48 | 0.0674 | 0.0521 |
| | | MgNH₄-stabilized | | | |
| 5 | 48.5 | 0.76 | 1.39 | 0.0141 | 0.0124 |
| 15 | 41.4 | 0.84 | 1.23 | 0.0155 | 0.009 |
| 25 | 53.9 | 0.74 | 1.33 | 0.0201 | 0.0089 |
| 35 | 72.0 | 0.79 | 2.26 | 0.0196 | 0.0061 |

In the above tables, "K₁B₁" and "K₅B₁" stand respectively for the mixtures in which the kaolinite-synthetic clay ratios were 1:1 and 5:1.

Conditions of the cracking runs were essentially the same as those noted for Example 1 hereinabove.

The favorable percent conversion obtained as well as the percent gasoline, here expressed as a fraction, may be noted.

Also, in the tables, "-ane/-ene" is the ratio of isobutane of the sum of isobutylene plus butene-1, in the cracked product; coke selectivity is the grams of coke produced per gram of cetane cracked; and hydrogen selectively is the volume of hydrogen in liters (standard conditions) per gram of cetane cracked.

When rare earth cations, magnesium ions, or any mixture of these are emplaced upon the faujasite, a wide range in concentration may be used. Thus, in general less than about 2 percent of the total cation exchange capacity of the faujasite will result in a scarcely appreciable amelioration; whereas more than 100 percent of the cation exchange capacity of the faujasite can be utilized only with difficulty. Thus, a practical range for this substitution is from 2 to 100 percent of the cation exchange capacity of the faujasite, whether the exchange is made on the faujasite initially or to several components of the composition, particularly when in slurry form, as heretofore described. The relative concentration of the cations among the several species names is not critical. As already mentioned, magnesium or calcium or rare earth ions may be utilized separately or in any combination thereof.

The faujasite further may be of the so-called "ultrastable" variety. This variant is described and explained in the paper by Ambs and Flank entitled "Thermal Behavior of Synthetic Faujasite", Journal of Catalysis 14, 118–125 (1969). The aforesaid article is hereby incorporated herein by reference, together with the papers cited in the bibliography thereof, which appears on pages 124 and 125.

It will be understood that while I have explained the invention with the aid of numerous specific examples, nevertheless considerable variation is possible in choice of raw materials, proportions, processing conditions, and the like, within the broad scope of the invention as set forth in the claims which follow:

Having described the invention, I claim:

1. A composition of matter adapted for the production of hydrocarbon cracking catalyst consisting essentially of coherent particles of an intimate intermixture of from about 15 to about 80 percent by weight of a synthetic clay-type mineral selected from the class consisting of a first species having the composition:

$$n\text{SiO}_2 : \text{Al}_2\text{O}_3 : m\text{AB} : x\text{H}_2\text{O}$$

where the layer lattices comprise said silica, said alimina and said B, and where $n$ is from 2.4 to 3.0, $m$ is from 0.2 to 0.6, A is one equivalent of ammonium cation and is external to the lattice, B is chosen from the group of negative ions which consists of $F^-$, $OH^-$, $\frac{1}{2} O^{--}$ and mixtures thereof, and is internal in the lattice, and $x$ is from 2.0 to 3.5 at 50 percent relative humidity, said mineral being characterize by a $d_{001}$ spacing at said humidity within the range which extends from a lower limit of about 10.4 A. to an upper limit of about 12.0 A;

and of a second species having the composition:

$$n\text{SiO}_2 : \text{Al}_2\text{O}_3 : m\text{AB} : x\text{H}_2\text{O}$$

where the layer lattices comprise said silica, said alumina, and said B, and where $n$ is more than 1.8 but less than 2.4, $m$ is from 0.4 to 0.8, A is one equivalent of ammonium cation and is external to the lattice, B is chosen from the group of negative ions which consists of $F^-$, $OH^-$, $\frac{1}{2} O^{--}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A.

and mixtures thereof;

from about 1 to about 40 percent of faujasite having a silica-alumina ratio within the range of about 3 to about 6½;

and from 5 up to about 70 percent of a silicate material chosen from the class consisting of kaolinite, metakaolinite, halloysite, metahalloysite, montmorillonite, and mixtures thereof.

2. A process for the production of the composition of matter of claim 1 which comprises admixing the individual components in comminuted form with sufficient water to form a slurry therewith, agitating said slurry until compositional homogeneity is obtained therein, and thereafter drying said slurry so as to produce solid particles having an essentially spherical form and exhibiting said compositional homogeneity within said particle.

3. A hydrocarbon cracking catalyst consisting essentially of coherent particles, said particles consisting essentially of an intimate intermixture of from about 15 to about 80 percent by weight of a synthetic clay-type mineral selected from the class consisting of a first species having the composition:

$$2.4 \text{ to } 3.0 \ SiO_2:Al_2O_3:0.2 \text{ to } 0.6 \ AB$$

wherein the layer lattices comprise said silica, said alumina and said B;

wherein A is one equivalent of hydrogen, and wherein B is one equivalent of an anion selected from the group consisting of fluoride, hydroxyl, and oxygen ions, and mixtures thereof;

said clay-type mineral being further characterized by a $d_{001}$ spacing ranging from 9.6 to 10.2 Angstrom units determined at 50 percent relative humidity and being predominantly ordered in two dimensions;

and of a second species having the composition:

$$kSiO_2:Al_2O_3:0.4 \text{ to } 0.8 \ AB$$

wherein the layer lattices comprise said silica, said alumina and said B;

wherein k is greater than 1.8 but less than 2.4;

wherein A is one equivalent of hydrogen, and wherein B is one equivalent of an anion selected from the group consisting of fluoride, hydroxyl, and oxygen ions, and mixtures thereof;

said clay-type mineral being further characterized by a $d_{001}$ spacing ranging from 9.6 to 10.2 Angstrom units determined at 50 percent relative humidity and being predominantly ordered in two dimensions, and mixtures thereof;

from about 1 to about 40 percent of faujasite having a silica-alumina ratio within the range of about 3 to about 6½;

and from 5 up to about 70 percent of a silicate material chosen from the class consisting of metakaolinite, metahalloysite, montmorillonite, and mixtures thereof.

4. A catalyst in accordance with claim 3 wherein said faujasite is selected from the class consisting of decationized faujasite and faujasite containing cations selected from the class consisting of hydrogen, magnesium, calcium, rare earth metal cations, and mixtures thereof.

5. A catalyst in accordance with claim 4 in which said magnesium, calcium, and rare earth metal cations are present in a total amount of from about 2 to about 100 percent of the total cation exchange capacity of said faujasite.

6. A process for the production of a hydrocarbon cracking catalyst which comprises the step of calcining the composition of matter of claim 1 at a temperature within the approximate range of about 1,200°F. to about 1,500°F. until said composition is substantially free of water and ammonia.

7. The process in accordance with claim 6 in which said calcining step is followed by treating with steam for a plurality of hours at a temperature within the range specified for said calcining step.

* * * * *